United States Patent
Smith et al.

(10) Patent No.: US 10,327,599 B2
(45) Date of Patent: Jun. 25, 2019

(54) APPARATUS AND PROCESS FOR DISPENSING A MEASURED QUANTITY OF LIQUID

(71) Applicant: The Procter & Gamble Company, Cincinnati, OH (US)

(72) Inventors: Christopher Lawrence Smith, Liberty Township, OH (US); Nicole Lynn Briggs, West Chester, OH (US); Hua Hu, Mason, OH (US); Richard Lawrence Horstman, Cincinnati, OH (US); Scott Eugene Mizer, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/962,032

(22) Filed: Apr. 25, 2018

(65) Prior Publication Data
US 2018/0310778 A1    Nov. 1, 2018

Related U.S. Application Data

(60) Provisional application No. 62/554,341, filed on Sep. 5, 2017, provisional application No. 62/490,080, filed on Apr. 26, 2017.

(51) Int. Cl.
| | | |
|---|---|---|
| *A47K 5/12* | (2006.01) | |
| *B65D 47/04* | (2006.01) | |
| *G01F 11/00* | (2006.01) | |
| *G01F 11/26* | (2006.01) | |
| *G01F 13/00* | (2006.01) | |

(52) U.S. Cl.
CPC .......... *A47K 5/1202* (2013.01); *B65D 47/043* (2013.01); *G01F 11/006* (2013.01); *G01F 11/262* (2013.01); *G01F 13/006* (2013.01)

(58) Field of Classification Search
CPC ... A47K 5/1202; B65D 47/043; G01F 11/006; G01F 11/262; G01F 13/006; B05B 11/0044; G04F 1/08
USPC .................. 222/454, 638, 639, 566–574, 651
See application file for complete search history.

(56) References Cited

U.S. PATENT DOCUMENTS

| | | | |
|---|---|---|---|
| 68,532 | A | 9/1867 | Rooney |
| 2,099,629 | A | 11/1937 | Schaetzel |
| 3,920,149 | A | 11/1975 | Fortino |
| 4,054,026 | A | 10/1977 | Goodrich |

(Continued)

FOREIGN PATENT DOCUMENTS

| | | |
|---|---|---|
| WO | WO02015097606 A3 | 10/2015 |
| WO | WO02018145645 A1 | 8/2018 |
| WO | WO02018147946 A1 | 8/2018 |

OTHER PUBLICATIONS

Homemade Water Clock, https://web.archive.org/web/20160522013315/https://teachbesideme.com/homade-water-clock/ May 22, 2016, 13 pages.

(Continued)

*Primary Examiner* — Patrick M. Buechner
*Assistant Examiner* — Michael J. Melaragno
(74) *Attorney, Agent, or Firm* — Gary J. Foose

(57) ABSTRACT

An apparatus and process for dispensing a measured quantity of liquid from a container. The apparatus includes a pour chamber having a dam, a spout, a vent, and a timer that is independent of flow in the pour chamber.

20 Claims, 15 Drawing Sheets

(56) References Cited

U.S. PATENT DOCUMENTS

| | | | |
|---|---|---|---|
| 4,353,489 A | 10/1982 | Arnold | |
| 4,550,862 A | 11/1985 | Barker | |
| 4,666,065 A | 5/1987 | Ohren | |
| 4,741,459 A | 5/1988 | Silvenis | |
| 4,836,415 A * | 6/1989 | Grussmark | G04F 1/06 206/216 |
| 5,031,804 A | 7/1991 | Conrad | |
| 5,058,772 A | 10/1991 | Moore | |
| 5,457,665 A * | 10/1995 | Reid | G04F 1/08 368/93 |
| 5,462,202 A | 10/1995 | Haffner | |
| 5,505,349 A | 4/1996 | Peckels | |
| 5,566,862 A | 10/1996 | Haffner | |
| 5,855,299 A | 1/1999 | Arnold | |
| 5,941,422 A | 8/1999 | Struble | |
| 6,036,055 A | 3/2000 | Mogadam | |
| 6,926,179 B2 | 8/2005 | Wagner, III | |
| 7,306,121 B2 | 12/2007 | Ophardt | |
| 7,845,524 B2 | 12/2010 | Evans | |
| 9,428,374 B2 | 8/2016 | Houck | |
| 9,717,373 B2 * | 8/2017 | Andrews | A47K 5/18 |
| 9,718,665 B2 | 8/2017 | Wittrup | |
| 2005/0103803 A1 | 5/2005 | Hung | |
| 2006/0091152 A1 | 5/2006 | Evans | |
| 2006/0091153 A1 | 5/2006 | Evans | |
| 2006/0131330 A1 | 6/2006 | Stebick | |
| 2007/0194047 A1 | 8/2007 | Tauber | |
| 2009/0045224 A1 | 2/2009 | Faaborg | |
| 2010/0116776 A1 | 5/2010 | Szekely | |
| 2010/0213211 A1 | 8/2010 | Dinger | |
| 2011/0297698 A1 | 12/2011 | Chiang | |
| 2013/0008919 A1 | 1/2013 | Ronan | |
| 2013/0334246 A1 | 12/2013 | Houck | |
| 2014/0252034 A1 | 9/2014 | Brannon | |
| 2015/0298875 A1 | 10/2015 | Dagnelie | |
| 2017/0073115 A1 | 3/2017 | Crawford | |
| 2019/0071299 A1 | 3/2019 | Briggs | |

OTHER PUBLICATIONS

Non-Final Office Action for U.S. Appl. No. 16/011,240, dated Dec. 28, 2018, 14 pages.
Non-Final Office Action for U.S. Appl. No. 16/011,259, dated Dec. 28, 2018, 14 pages.
PCT International Search Report for International Application No. PCT/US20181029306, dated Aug. 10, 2018, 16 pages.
U.S. Appl. No. 16/011,240, dated Jun. 18, 2018, Briggs et al.
U.S. Appl. No. 16/011,259, dated Jun. 18, 2018, Mizer et al.

* cited by examiner

US 10,327,599 B2

APPARATUS AND PROCESS FOR DISPENSING A MEASURED QUANTITY OF LIQUID

FIELD OF THE INVENTION

Liquid dispensing.

BACKGROUND OF THE INVENTION

Many liquid products are dispensed from containers through an open end of the container or through a dispensing system that forms part of the closure for a container. For instance, liquid laundry products commonly packaged in a container having a spout fitment fitted thereto and closure that engages with the spout fitment and or container. The closure often has a secondary purpose to function as a measuring cup and is provided with dosing indicia on the interior or exterior of the closure, the indicia having the form lines or bars marked on the interior wall of the closure that correspond with particular volumes of liquid that are desirable to use depending on the size of the load of laundry or other washing conditions.

Sometimes it can take some effort for the consumer to precisely dispense the desired amount of liquid laundry product into the dosing cup. If the consumer under-doses the product, he or she may be dissatisfied with the performance of the liquid laundry product because he or she failed to use an effective amount of the product. If the consumer over-doses the product, the consumer may be dissatisfied with the number of loads of laundry he or she can do with a single container of liquid laundry product.

There are a variety of devices that have a purpose of measuring the quantity of liquid dispensed from a container as the container dispenses the liquid. Measuring the quantity of liquid dispensed when pouring a liquid from a container is an exceptionally challenging task because the flow rate from container may not be constant, air entering the container to replace the liquid displaced may result in irregular liquid flow from the container, and the dynamics of liquid flow through constrictions and multiple pathways out of the container is complicated.

With these limitations in mind, there is a continued unaddressed need for apparatuses and process for dispensing a measured quantity of liquid.

SUMMARY OF THE INVENTION

An apparatus (10) comprising: a pour chamber (20) comprising an inlet end (30) and an outlet end (40) and a pour chamber wall (50) extending from said inlet end to said outlet end, wherein said pour chamber has an open cross sectional area (60) through which flow can occur from said inlet end to said outlet end, wherein said open cross section area is a function of position between said inlet end and said outlet end, said outlet end being downstream of said inlet end, wherein said outlet end has an outlet perimeter (90), and wherein a portion of said pour chamber upstream of said outlet end is a spout (45) having a spout entrance (47) upstream of said outlet end; a dam (80) engaged with said pour chamber wall and positioned between said inlet end and said spout, wherein said open cross sectional area is reduced where said dam is positioned as compared to a position immediately upstream of said dam, and wherein said dam partially obstructs said spout entrance; a vent (100) comprising an entrance (105) exterior to said outlet end and a vent wall (120) extending from said entrance to an exit (130), wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter (140) and said outlet perimeter is more than about 2 times greater than said exit perimeter; and a timer (150) engaged with said pour chamber, said timer comprising: a source reservoir (170); a collection reservoir (180) having an interior space (190) and an exterior surface (200), wherein at least a portion of said interior space is visible from said exterior surface; a timing orifice (210) connecting said source reservoir and said collection reservoir; an opening (220) connecting said collection reservoir and said source reservoir positioned away from said timing orifice; and a timing liquid (230) having a fixed volume contained in one or both of said source reservoir and said collection reservoir, wherein said timing liquid, said source reservoir, and said collection reservoir are not in fluid communication with said pour chamber.

BRIEF DESCRIPTION OF THE DRAWINGS

FIG. 5 is a top view image of an apparatus with the timer removed there from.
FIG. 6 is an image of an apparatus with the timer removed there from.

DETAILED DESCRIPTION OF THE INVENTION

Figure 1:
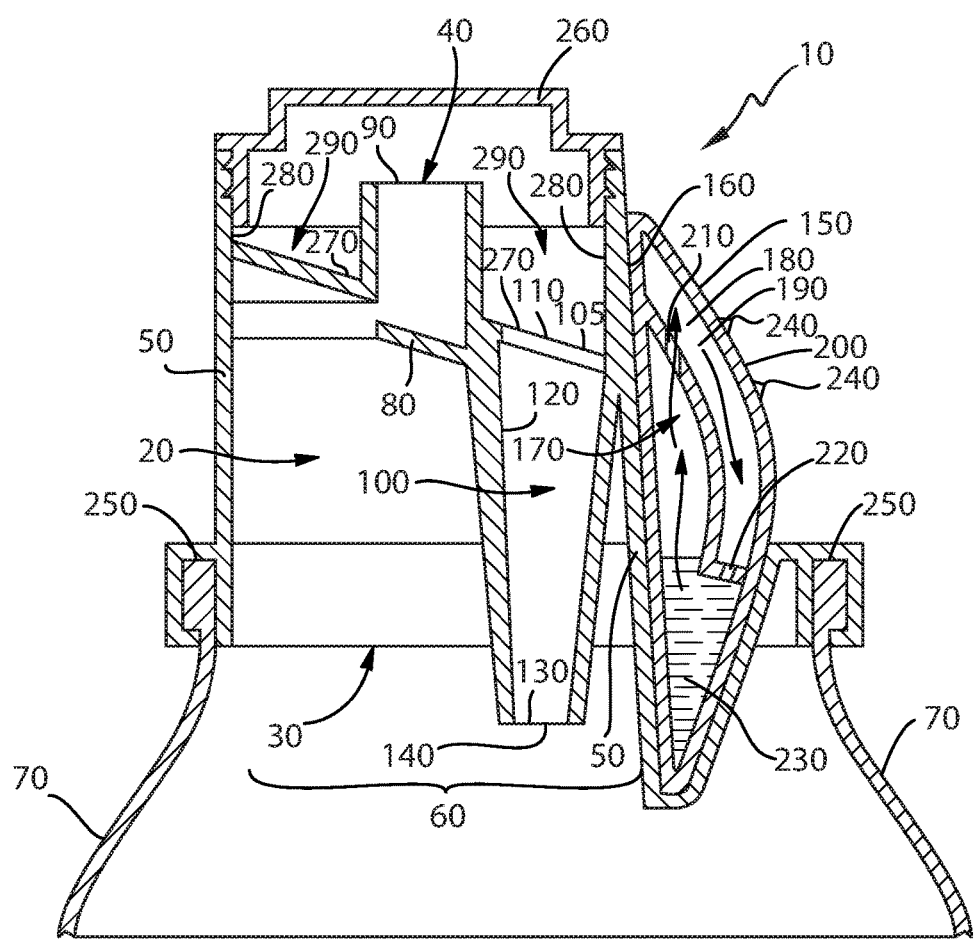
FIG. 1 is a cross section of an apparatus.
Figure 2:
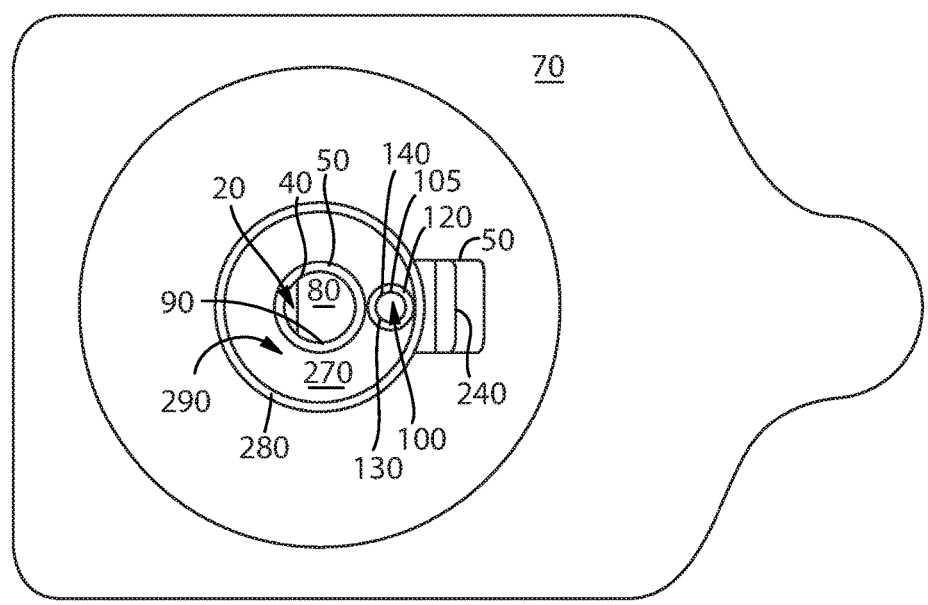
FIG. 2 is a top view of an apparatus.
Figure 3:
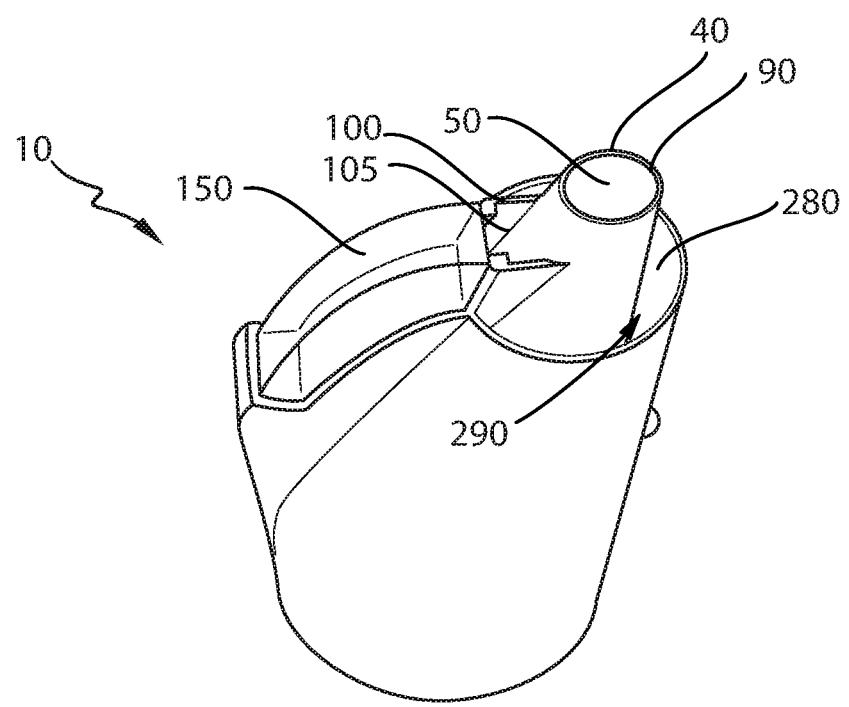
FIG. 3 is an image of an apparatus.
Figure 4:
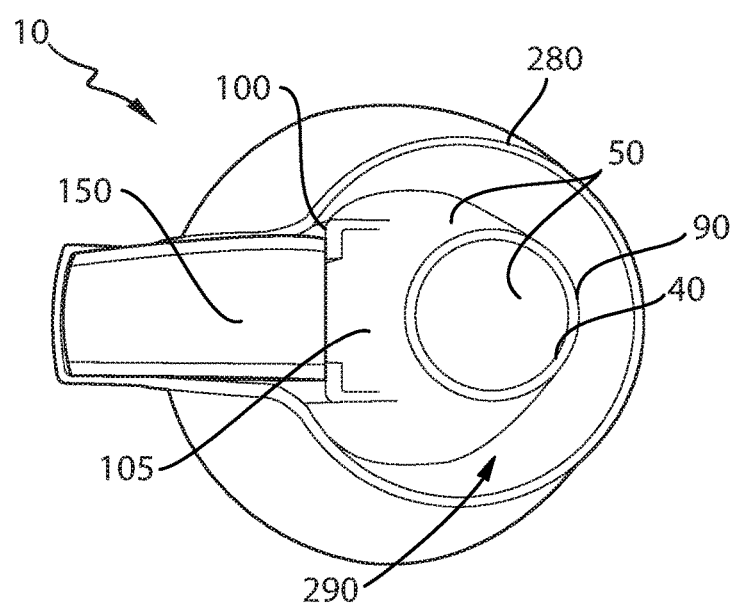
FIG. 4 is a top view image of an apparatus.
Figure 5:
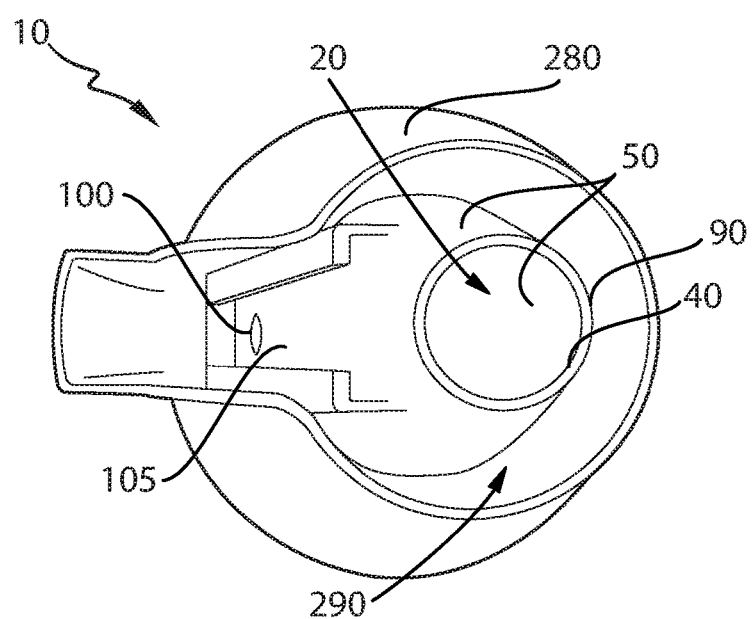
Figure 6:
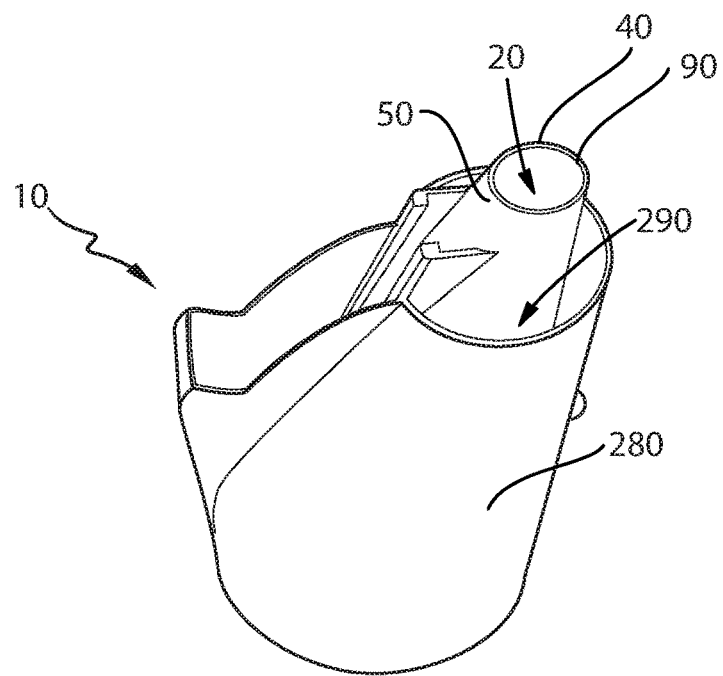

FIG. 1 is an apparatus 10 comprising a pour chamber 20. The pour chamber 20 comprises an inlet end 30, an outlet end 40, and pour chamber wall 50 extending from the inlet end 30 to the outlet end 40. The pour chamber 20 has an open cross sectional area 60. The open cross sectional area 60 can be taken at various planes parallel to the inlet end 30. For a spout in which a longitudinal axis L passing through the open end 30 of the spout 45 also passes through the inlet end 30, the longitudinal axis L can be orthogonal to the inlet end 30. The pour chamber 20 is the location through which liquid from the container 70 passes on its way past the dam 80 and through the outlet end 40. In use, the aforesaid elements may form part of a closure system for a container 70. As the user tips the container 70 to dispense liquid from the container 70, the liquid may flow from the container through the inlet end 30, then downstream through the pour chamber 20, then further downstream through the outlet end 40 to be dispensed, for example to a bucket, washing machine, compartment of a washing machine, or the like.

The inlet end 30 can have an open cross sectional area 60 from about 3 cm$^2$ to about 40 cm$^2$, optionally from about 5 cm$^2$ to about 20 mm$^2$. The outlet end 40 can have an open cross sectional area 60 from about 0.25 cm$^2$ to about 8 cm$^2$. The open cross sectional area 60 of the inlet end 30 can be smaller than the open cross sectional area 60 of the outlet end 40. The open cross sectional area 60 is measured in planes through which flow can occur and varies as a function of position from the inlet end 30 to the outlet end and the open cross sectional area 60. That is, open portions that are along dead end paths are not measured. Only the portion or portions through which flow can be active are considered. The pour chamber 20 can be generally tapered. The pour chamber 20 can be tapered or constricted from the inlet end 30 to the outlet end 40. The pour chamber 20 can be generally conically shaped. The inlet end 30 can have an open cross sectional area 60 that is greater than the open cross sectional area 60 of the outlet end 40. It is possible that constriction from the inlet end 30 to the outlet end 40 can help concentrate flow of the liquid and provide an oversupply of liquid from the container towards the outlet end 40 so that the flow rate out of the outlet end 40 is reasonably or substantially steady since the flow rate may be constrained by one or more of the limiting flow rate of the pour chamber 20, the limiting flow rate of the outlet end 40, the limiting flow rate of the spout 45, or limiting flow rate past the dam 80. Within the pour chamber 20, there may be features such as a vent 100 that passes through the pour chamber 20, the dam 80, and other appurtenances such as the structure to connect the apparatus 10 to a container 70, for example threads or a bead design to be snap-fit to the neck of a container 70.

The outlet end 40 can have a diameter of from about 3 mm to about 30 mm, optionally about 5 mm to about 20 mm, further optionally about 5 mm to about 15 mm, optionally about 10 mm. The smaller the diameter or open cross sectional area of the outlet end 40 the slower the flowrate of liquid product will be for a given liquid product. The outlet end 40 can have an open cross sectional area of from about 7 mm$^2$ to about 700 mm$^2$, optionally about 20 mm$^2$ to about 700 mm$^2$, optionally about 20 mm$^2$ to about 300 mm$^2$, optionally about 75 mm$^2$.

A portion of the pour chamber 20 upstream of the outlet end 40 can be a spout 45. The spout 45 can have a spout entrance 47 upstream of the outlet end 40. A spout can be a narrowed portion of the pour chamber 20 provided to focus flow of liquid product over a small area when the liquid product exits the outlet end 40. The aforesaid ranges of diameter and open cross sectional area for the outlet end 40 can be suitable for the outlet end 40 of the spout 45.

Figure 7:
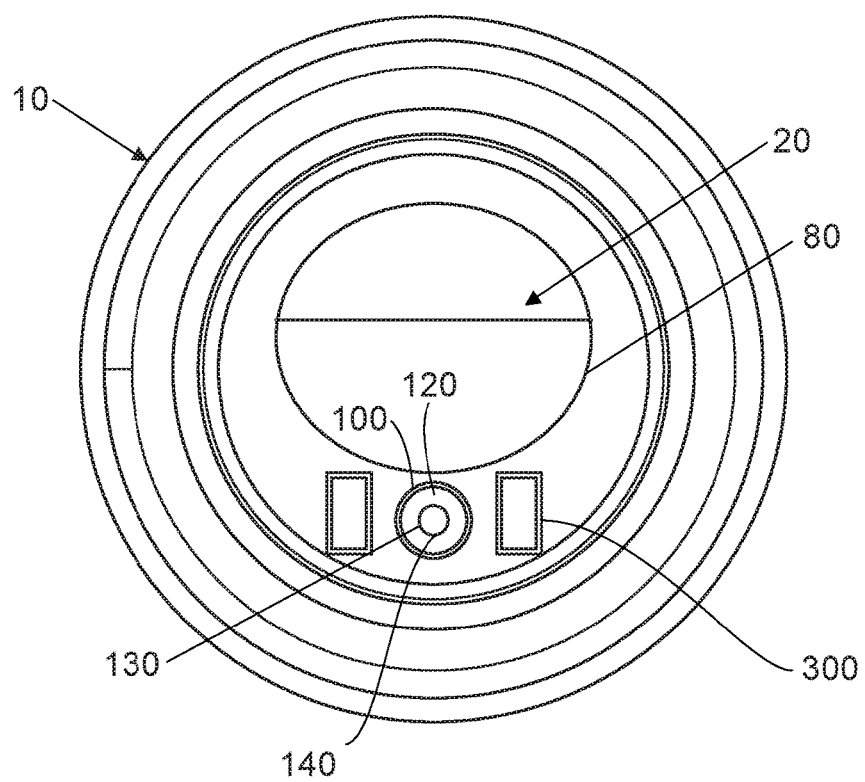
FIG. 7 is a bottom view image of an apparatus. Each of FIGS. 3-7 are views of the same apparatus in various states of assembly/disassembly taken from different perspectives.
Figure 8:
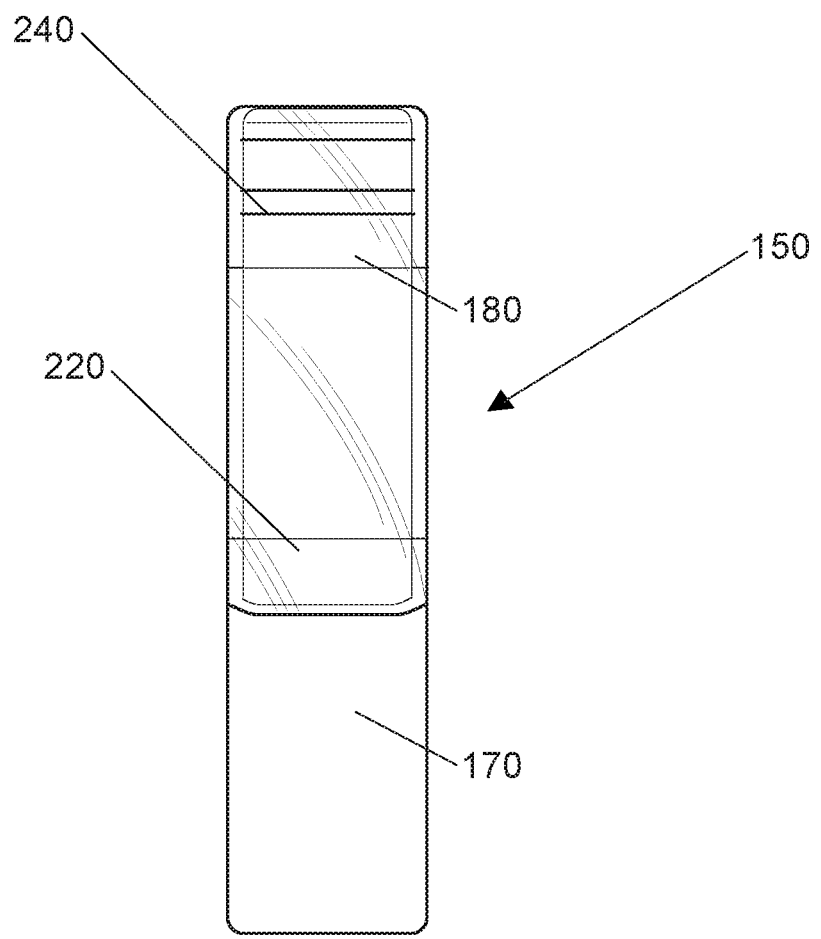
FIG. 8 is a timer shown in the first position in which timing liquid is contained in the source reservoir, ready to be tipped so that timing liquid can flow through the timing orifice into the collection reservoir.
Figure 9:
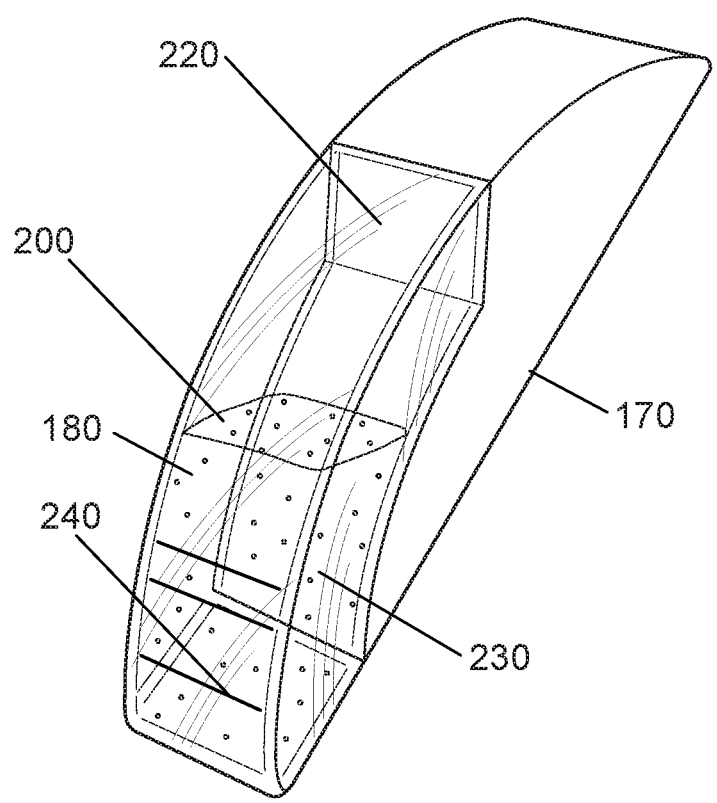
FIG. 9 is a timer shown in the second position in which timing liquid has flowed from the source reservoir to the collection reservoir and reached the level of a dosing indicia. The timer is tipped to correspond with a position that the timer could be in when liquid is dispensed from the apparatus.
Figure 10:
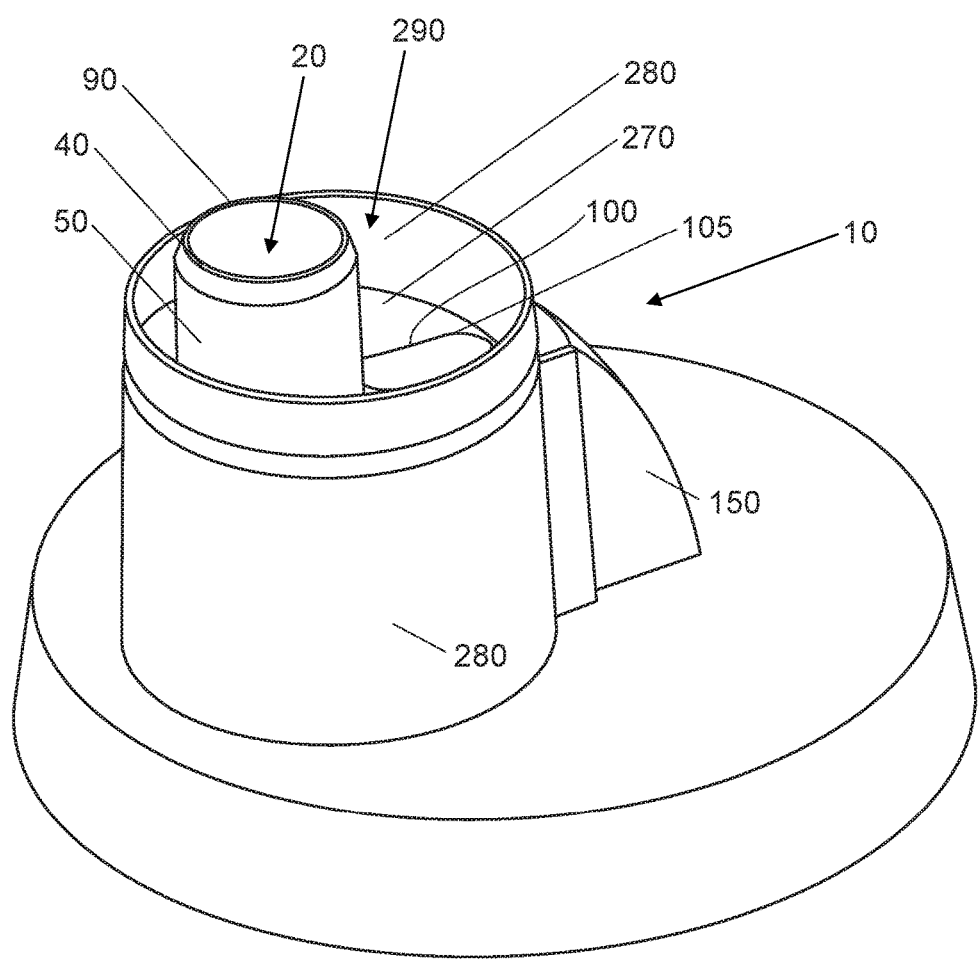
FIG. 10 is a perspective view of an apparatus.
Figure 11:
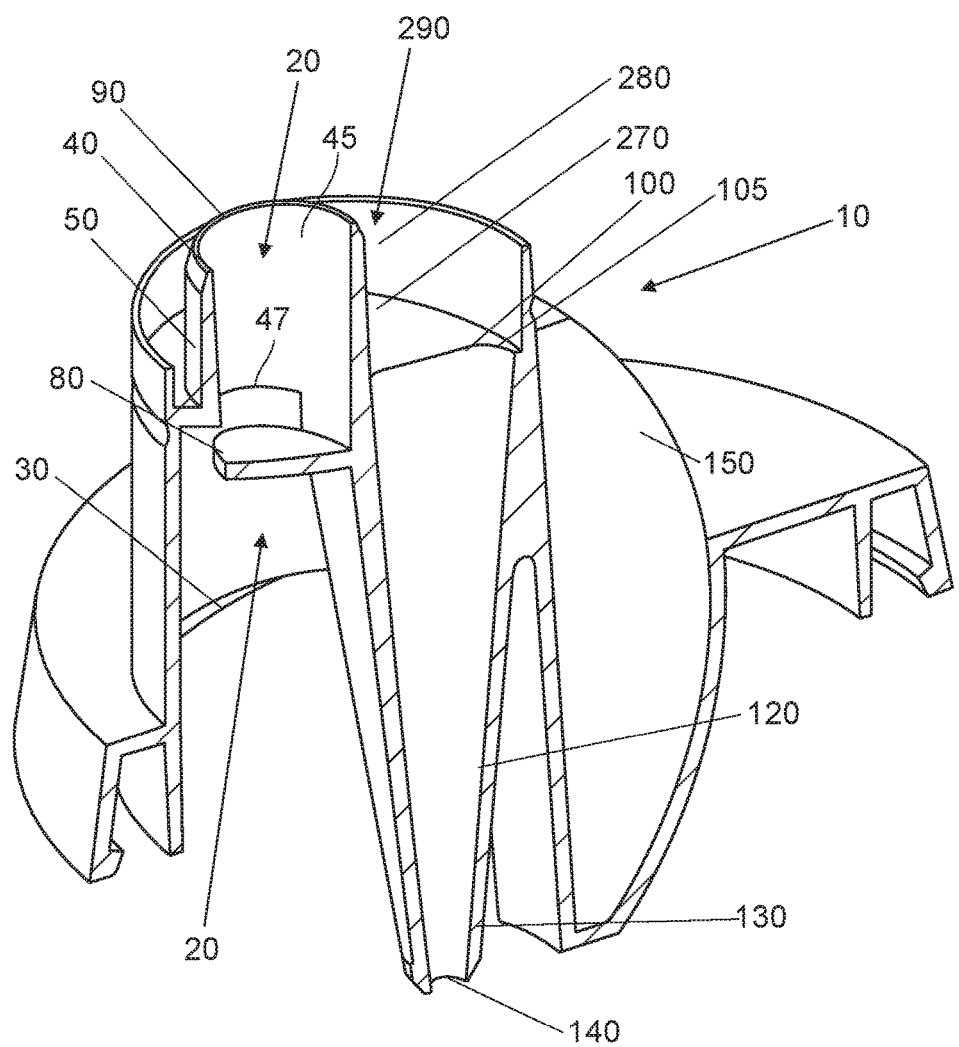
FIG. 11 is cutaway view of an apparatus.
Figure 14:
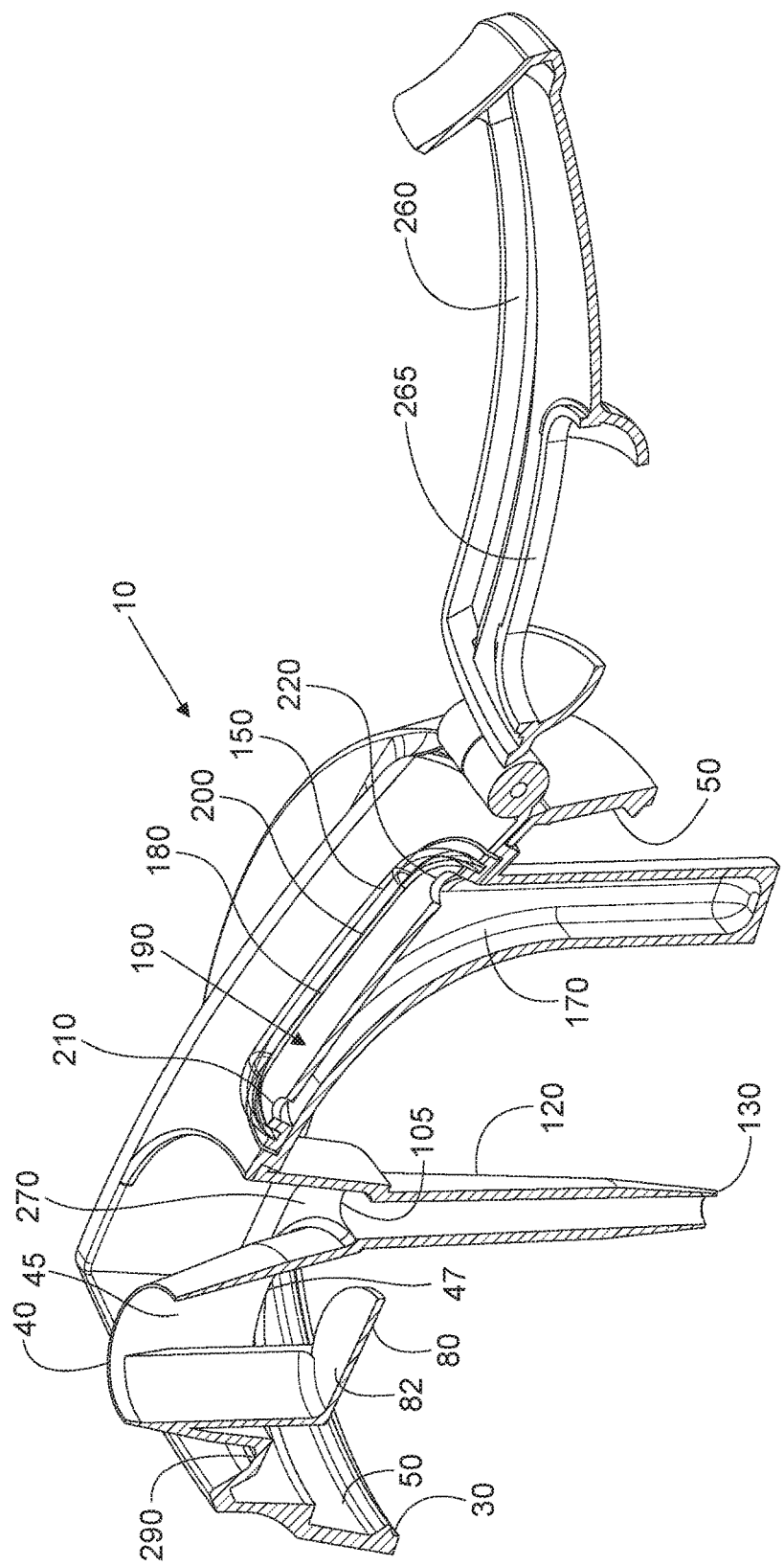
FIG. 14 is a perspective view of a cross section of an apparatus.

The apparatus 10 comprises a dam 80 engaged with the pour chamber wall 50. The dam 80 can be a structure that blocks flow of liquid product from edge to edge of the flow path when the apparatus 10 is in a position to dispense liquid product, by way of nonlimiting example as in FIG. 7. That is much like a dam extending between the banks of a river, except in the context of pouring, flow over the dam, or even full flow in the space between the edge of the dam 80 and the interior of the pour chamber 20 above the dam, may be desired. Optionally, the dam 80 can be a structure that resists flow of liquid product, forcing liquid product to flow around the dam 80 before reaching the spout entrance 47, by way of nonlimiting example as shown in FIG. 14. For instance, the dam 80 can be an obstruction in the pathway of flow of the liquid product. That is, liquid product may flow over the top of and or around the sides of the dam 80. The dam 80 can be positioned so that it is in line with the spout entrance 47. The dam 80 can be positioned to be in line with the centerline of the spout entrance. The dam 80 can be positioned so that it locally diverts at or near the spout entrance 47 stream lines of liquid product flow from the inlet end 30 to the spout entrance 47. The dam 80 can act to divert streamlines of liquid product flow from the inlet end to the outlet end, and in particular divert or lengthen streamlines of liquid product flow at or near the entrance to the spout entrance 47.

The dam 80 is positioned between the inlet end 30 and the outlet end 40. In this position, the dam 80 partially obstructs the spout entrance 47. For example, as shown in FIG. 1, which is a nonlimiting example, the dam 80 can be just upstream of the spout entrance 47. In that position, or in the position of the dam 80 shown in FIGS. 12-15, which are also nonlimiting examples, the dam 80 is considered to partially obstruct the spout entrance 47. Liquid dispensed from the container 70 passes from the container 70, through the inlet end 30, into the pour chamber 20, over, around, or past the dam 80, into the spout entrance 47, and through the outlet end 40. The dam 80 is in the interior of the pour chamber 20. The dam 80 can help to reduce the influence of the total head upstream of the dam on the flow rate of the liquid product past the dam 80 and can have a comparatively large or even greater effect on flow rate out of the outlet end 40 than the shape of the pour chamber 20, the surface roughness of the pour chamber 20, and total head above the dam 80 when the apparatus 10 is in a position in which liquid product is dispensed from the apparatus 10.

The dam 80 reduces the open cross sectional area 60 where the dam 80 is positioned as compared to a position immediately upstream of the dam 80. The dam 80 can be positioned at the spout entrance 47, immediately upstream of the spout entrance 47, or upstream of the spout entrance 47. The dam 80 can positioned nearer to the spout entrance 47 than to the inlet end 30. The dam 80 can positioned so that it has an effect or even large effect, or even a significant effect on the flow of liquid product into the spout 45. That is, the dam 80 can have a comparatively larger effect on flow of the liquid product into the spout 45 than other features within or defining the pour chamber 20 that are upstream of the dam 80. A function of the dam 80 is to provide for a structural feature that has a substantial impact on the flow rate of liquid product out of the outlet end 40, which can serve reduce the impact of total head of the liquid product above the inlet end 30 or dam 80 on flow rate of the liquid product out of the outlet end 40.

The dam 80 can reduce the open cross sectional area by more than about 10%, optionally more than about 20%, further optionally more than about 30%, where the dam is positioned as compared to a position immediately upstream of the dam 80. In use, flow through the pour chamber 20 is from upstream to downstream, which is from the inlet end 30, past the dam 80, and out the outlet end 40. Just upstream of the dam 80, there may be a relatively large open cross sectional area and at the dam 80 the open cross sectional area can be reduced abruptly. For instance, just upstream of the dam 80 the open cross sectional area can be from about 1000 mm$^2$ to about 10000 mm$^2$, optionally from about 2000 mm$^2$ to about 7000 mm², optionally about 3000 mm² to about 5000 mm², optionally about 4000 mm².

The dam 80 can be positioned nearer to the outlet end 40 than the inlet end 30. This is thought to provide for continual collection in the pour chamber 20 of a sufficient quantity of liquid to provide nearly a constant flow rate of liquid past the dam 80 towards the outlet end 40. The dam 80 can block more than about 10% of the open cross sectional area 60 of the pour chamber 20 at the location where the dam 80 is positioned. The dam 80 can block more than about 20% of the open cross sectional area 60 of the pour chamber 20 at the location where the dam 80 is positioned. The dam 80 can block more than about 30% of the open cross sectional area 60 of the pour chamber 20 at the location where the dam 80 is positioned. The dam 80 can block more than about 40% of the open cross sectional area 60 of the pour chamber 20 at the location where the dam 80 is positioned. The dam 80 can block more than about 50% of the open cross sectional area 60 of the pour chamber 20 at the location where the dam 80 is positioned. The dam 80 can block more than about 60% of the open cross sectional area 60 of the pour chamber 20 at the location where the dam 80 is positioned. The more the dam 80 blocks flow, the more likely it is that a sufficient volume of liquid product will be behind the dam 80 to support steady flow over or past the dam 80 and the slower the liquid product will flow out the outlet end 40.

The dam 80 can have a dam face area that is more than about 20% of the open cross section area 60 of the outlet end 40. The dam face area is measured as the projected area of the dam presented downstream towards the inlet end 30. The dam face area can be from about 50 mm² to about 200 mm², optionally about 80 mm² to about 160 mm², optionally about 100 mm² to about 140 mm², optionally about 120 mm². The dam 80 can have a dam face area that is more than about 30% of the open cross section area 60 of the outlet end 40. The dam 80 can have a dam face area that is more than about 40% of the open cross section area 60 of the outlet end 40. The dam 80 can have a dam face area that is more than about 50% of the open cross section area 60 of the outlet end 40. The dam 80 can have a dam face area that is more than about 70% of the open cross section area 60 of the outlet end 40. The dam 80 can have a dam face area that is more than about 90% of the open cross section area 60 of the outlet end 40. The dam 80 can be located from about 1 mm to about 40 mm, or optionally 10 mm to about 30 mm, or optionally about 15 mm to about 25 mm from the outlet end 40, or optionally about 20 mm from the outlet end 40, or optionally from about 1 mm to about 6 mm, or optionally about 1 mm to 4 mm from the outlet end 40.

The dam 80 can have a downstream face 82 oriented downstream towards the outlet end 40 and an opposing upstream face 84 oriented upstream towards the inlet end 30. The dam 80 can divert stream lines of liquid flow from the inlet end 30 to outlet end 40. That is, streamlines of liquid flow from the inlet end 30 to the outlet end 40 can be nonlinear.

At least a portion of the dam 80 can intersect a straight longitudinal axis L passing through the outlet end 40 and orthogonal to the inlet end 30. Arranged as such, when a user looks down through the outlet end 40, at least a portion of the dam 80 can obstruct the view of the inlet end 30. The spout 45 can be a straight spout through which a straight longitudinal axis L can pass without intersecting the spout 45. Optionally, the spout 45 can be curved such that a straight longitudinal axis L cannot pass through the spout 45 without intersecting an interior wall of the spout 45.

The outlet end 40 has an outlet perimeter 90. The outlet perimeter 90 is the interior perimeter of the pour chamber 20 at the outlet end 40. The outlet perimeter 90 is a scalar quantity. The outlet perimeter 90 can be from about 6 mm to about 60 mm, optionally from about 8 mm to about 30 mm, optionally from about 10 mm to about 20 mm. The smaller the outlet perimeter 90 the more constricted the flow of liquid will be after it exits the outlet end 40.

The apparatus can comprise a vent 100. The vent 100 can comprise an entrance 110 exterior to the outlet end 40 and a vent wall 120 extending from the entrance 110 to an exit 130. That is, the vent entrance 110 can be spaced apart from the outlet end 40. The vent entrance 110 can have an area of from about 5 mm² to about 50 mm², optionally from about 20 mm² to about 30 mm², optionally about 28 mm². The vent entrance 110 only needs to be large enough to permit a sufficient quantity of air to flow back into the container 70 as liquid product is emptied from the container 70 so that the air pressure within the container 70 is equalized with the ambient air pressure.

The exit 130 can be in fluid communication with the pour chamber 20. The vent 100 provides for pathway for air from the external environment to enter into the container 70 to replace the liquid dispensed from the container 70. The vent 100 can be separated from the outlet end 40 so that flow of liquid from the outlet end 40 does not interfere with venting of the container 70. To provide for steady flow of liquid from the outlet end 40 and steady flow of air back into the bottle 70 the liquid flow from the outlet end 40 can be independent of the air entry into the entrance 110 of the vent 100.

The exit 130 can be more distant from the dam 80 than the outlet end 40 is from the dam 80. This may help reduce the impact of air passing through the vent 100 and out the exit 130 from interfering will flow of liquid past the dam 80. This in turn can help provide for a sufficiently steady flow rate of liquid product past the dam 80 and out the outlet end 40. Separating the flow past the dam 80 from bubbles entering the container through the vent 100 reduces the impact of air entering the container 70 on flow rate of liquid product out of the container 70.

The exit 130 can be more than about 0.5 times the outlet perimeter 90 away from the dam 80. This may also help separate venting of air back into the container 70 from liquid being discharged from the outlet end 40. The spatial relationship of exit 130 and the dam 80 is taken to be the minimum straight line distance between the dam 80 and the interior wall of the exit 130.

The exit 130 can be more than about 1.5 time more distant from the dam 80 than the outlet end 40 is from the dam 80. This may be helpful by providing enough distance between the dam 80 and the exit 130 so that air being vented back into the container 70 has little or no effect on the flow of liquid being dispensed from the container past the dam 80.

The exit 130 can have an exit perimeter 140. The exit perimeter 140 is the interior perimeter of the vent wall 120 at the exit 130. The outlet perimeter 90 can be more than about 2 times greater than the exit perimeter 140. The exit perimeter 140 can be from about 0.1 mm to about 12 mm. The exit perimeter 140 can be from about 1 mm to about 12 mm. The exit perimeter 140 can be from about 2 mm to about 4 mm. The exit perimeter 140 can be about 3.8 mm. A smaller exit perimeter 140 can be practical for reducing the potential for a double pour, which is a situation in which liquid is discharged from the outlet end 40 and the entrance 110 of the vent. The capillary force of the liquid product can resist entry into the exit 130. The outlet perimeter 90 can be from about 1 mm to about 60 mm, optionally from about 1 mm to about 20 mm, optionally from about 2 mm to about 10 mm.

The ratio between the outlet perimeter 90 and the exit perimeter 140 can be from about 2:1 to about 20:1. Having the outlet perimeter 90 much larger than the exit perimeter 140 can reduce the potential for the liquid product to pour out of both the outlet end 40 and the entrance 110 of the vent 100. The smaller the exit perimeter 140, the less likelihood of liquid product entering the vent since capillary forces in the liquid product will resist entry of the liquid product into the exit 130 of the vent. The ratio between the outlet perimeter 90 and the exit perimeter 140 can be from about 3:1 to about 15:1, optionally about 3:1 to about 5:1, or optionally about 10:1. The greater the kinematic viscosity of the liquid product, the larger the ratio between the outlet perimeter 90 and exit perimeter 140 can be. The exit 130 can have an area from about 1 $mm^2$ to about 30 $mm^2$, optionally about 2 $mm^2$ to about 20 $mm^2$, optionally from about 3 $mm^2$ to about 10 $mm^2$, optionally about 7 $mm^2$. The exit 130 can have a diameter of from about 0.5 mm to about 5 mm, optionally about 1 mm to about 3 mm.

The apparatus 10 can further comprise a timer 150. The timer 150 can be hydraulically isolated from the exit 130, the outlet end 40, and or both the exit 130 and the outlet end 40. Said otherwise, the timer 150 can be free of fluid communication between the timer 150 and the outlet end 40. The timer 150 can be engaged with the pour chamber 20. The timer 150 can be engaged with the pour chamber 20 by being mounted on an exterior face 160 of the pour chamber 20. Optionally, the timer 150 can be engaged with the pour chamber 20 by being joined to the container 70. The timer 150 can be joined to the pour chamber 20 by being joined to an element that connects the timer 150 and the pour chamber 20.

The timer 150 can comprise a source reservoir 170. The timer 150 can further comprise a collection reservoir 180. The collection reservoir 180 can have an interior space 190 and an exterior surface 200. At least a portion of the interior space 190 can be visible from the exterior surface 200. A timing orifice 210 can connect the source reservoir 170 and the collection reservoir 180. The timing orifice 210 can be considered to provide fluid communication between the source reservoir 170 and the collection reservoir 180. The source reservoir 170 and collection reservoir 180 can be further connected to one another through an opening 220 connecting the collection reservoir 180 and the source reservoir 170. The opening 220 can be positioned away from the timing orifice 210. The timing orifice 210 can have a diameter of from about 0.2 mm to about 1.2 mm, optionally about 0.8 mm. The opening 220 can have a diameter from about 0.2 mm to about 4 mm, optionally about 1.6 mm. The opening 220 can provide for a pathway of fluid communication from the collection reservoir 180 back to the source reservoir 170 after liquid product is dispensed. The timing orifice 210 can have a perimeter from about 0.01 mm to about 1 mm. The timing orifice 210 can have a perimeter from about 0.01 mm to about 0.7 mm.

The timing orifice 210 can be sized and dimensioned to provide for a particular range of flow rates of the timing liquid 230. The open area of the timing orifice 210 can be set based on the amount of time the designer wants to provide for liquid dispensing from the container 70. Since the flow rate of liquid from the outlet end 40 is a function of the size and shape of the inlet end 30, outlet end 40, pour chamber 20 and dam 80, and the total head of the timing liquid 230 at the timing orifice 210, the designer can pick a desired quantity of liquid to be dispensed and measure the amount of time it takes for such liquid to exit the outlet end 40. Then the designer can compute the size of the open area of the timing orifice such that flow of the timing liquid 230 from the source reservoir 170 to the collection reservoir 180 can be an indicator of the quantity of liquid dispensed from the container. The designer is also able to determine the quantity of timing liquid 230 to be provided in the timer 150.

As timing liquid 230 flows from the source reservoir 170 to the collection reservoir 180, air, or whatever other gas is within the timer 150, that is in the collection reservoir 180 can be displaced through the opening 220 as timing liquid 230 begins to fill the collection reservoir 180. The collection reservoir 180 can have a volume from about 0.4 $cm^3$ to about 2 $cm^3$, optionally from about 0.5 $cm^3$ to about 1 $cm^3$, optionally about 0.78 $cm^3$.

With the apparatus in the second position, once the timing liquid 130 reaches the desired dosing indicia 240, the user can transfer the apparatus 10 from the second position back to the first position. Timing liquid 130 can then drain back through the opening 220 into the source reservoir 170. The timing liquid 130 remains separate from the liquid product being dispensed and in use moves in a loop from the source reservoir 170, through the timing orifice 210, into the collection reservoir 180 up to a level of a dosing indicia, out of the collection reservoir 180 via the opening 220, and back into the source reservoir 170.

The timing liquid 230 can have a fixed volume or mass. The fixed volume of timing liquid can be from about 0.5 $cm^3$ to about 2 $cm^3$, optionally from about 1.25 $cm^3$. The timing liquid can be contained in one or both of the source reservoir 170 and the collection reservoir 180. The timing liquid 230, the source reservoir 170, and the collection reservoir 180 are not in fluid communication with the pour chamber 20, or outlet end 40. This enables functional separation of the timing aspect and the liquid product dispensing from the container 70. Since liquid product flow from a container 70 is dynamically complex, attempting to use a timer that is in liquid communication with contents of the container 70 is complicated by the complex liquid flow regime from the container 70. Further, venting of air back into the bottle may complicate measurement of volume of liquid dispensed. Liquid product dispensing systems in which the timer is in fluid communication with the pour chamber 20 or outlet end 40 do not have the desired level of accuracy or precision for provided a particular quantity of liquid product. For instance, one technical approach may be to divert a portion of the liquid product on its way towards the outlet end to a timer in which the liquid product accumulates in the timer as an indicator of the volume poured. This type of system is not accurate to the degree desired because of the complexity of proportionally routing liquid product out of the outlet end and to the timer. The proportional routing may be function of the angle of pouring.

The timing liquid can comprise glycerin, water, alcohol, or other substance that is liquid at a temperature from about 0 C to about 60 C.

The apparatus 10 can be considered to have a first position in which the outlet end 40 is above the inlet end 30 and a second position in which the inlet end 30 is above the outlet end 40. When the apparatus 10 is in the first position, the collection reservoir 180 may be devoid of timing liquid 230. Or if there is timing liquid 230 in the collection reservoir 180, then that portion of the collection reservoir 180 may be rendered obscured or opaque so that the consumer cannot see the timing liquid 230. The first position of the apparatus 10 is in an upright position in which the pour chamber 20 is mounted to a container 70 that this resting on its base so that the pour chamber 20 is above the container 70.

When the apparatus 10 is in the second position a greater quantity of the timing liquid 230 is in the collection reservoir 180 than when the apparatus 10 is in the first position. Further, in the second position, the timing liquid 230 can be visible from the exterior surface 200 of the collection reservoir 180. The second position of the apparatus 10 is in a tipped position so that the outlet end 40 is below the inlet end 30. In this position, liquid product can be dispensed from the outlet end 40. The second position corresponds to the position of the apparatus 10 when a consumer tips or inverts a container 70 to dispense liquid product from the container 70.

In the first position, the outlet end 40 can be above the inlet end 30. In the second position the inlet end 30 can be above the outlet end 40. When the apparatus is in the first position, the timing orifice 210 is above the opening 220. When the apparatus 10 is transitioned from the first position to the second position, the timing orifice 210 can be below the opening 220 and as the apparatus 10 is transitioned from the first position to the second position the timing liquid 230 begins to move and continues to move from the source reservoir 170 to the collection reservoir 180 through the timing orifice 210. So long as there is timing liquid 230 above the timing orifice 210 and the total head on the source reservoir 170 side of the timing orifice 210 is greater than the total head on the collection reservoir 180 side of the timing orifice 210, timing liquid 230 will move from the source reservoir 170 to the collection reservoir 180. The timing orifice 210 can have a perimeter from about 0.01 mm to about 4 mm. The timing orifice 210 can have a perimeter from about 0.01 mm to about 1 mm. The timing orifice 210 can have a perimeter from about 0.01 mm to about 0.7 mm. The perimeter and shape of the timing orifice can be chosen so that the timing liquid 230 flows through the timing orifice at a flow rate that can be observed and tracked by the consumer pouring liquid from the container 70. The flow rate needs to be high enough, and set in regards to the size of the outlet end 40 so that the duration of pouring is not too long so as not to become uncomfortable to the user. The duration of pour can be from about 2 s to about 10 s, optionally from about 4 s to about 7 s.

The collection reservoir 180 can comprise at least one dosing indicia 240 visible on the exterior surface 200. The dosing indicia 240 can be, by way of nonlimiting example, a raised portion of the exterior surface 200, a printed mark on the exterior surface 200, a pigmented or dyed portion of the collection reservoir 180, or a printed marked on the interior surface of the collection reservoir 180. The dosing indicia 240 can be indicative of a volume of liquid dispensed out the outlet end 40 that corresponds to a recommended dose of liquid product. Multiple dosing indicia 240 can be provided as part of the collection reservoir 180.

The apparatus can further comprise a container 70 having an open end 250. The pour chamber 20, dam 80, vent 100, and timer 150 can be engaged with the open end 250. For instance, together the pour chamber 20, dam 80, vent 100, and timer 150 can together form a fitment that fits onto and or into the open end 250 of the container 70.

An outlet closure 260 can be engaged with the outlet end 40 of the pour chamber 20. Optionally, the outlet closure 260 can be engaged with the pour chamber 20 to close both the outlet end 40 and the vent 100. The outlet closure 260 helps to prevent spillage liquid from the container 70 in the event that the container is unintentionally inverted. The apparatus 10 can be connected to a container 70 as a fitment, snapped to, or threaded to the container 70. The open end of the container 70 can have threads on the interior of the open end or the exterior. The apparatus 10 can be screwed onto the container 70. The interior of the apparatus can have threads engageable with external threads on the container 70.

The apparatus 10 can be provided with a drain-back feature. A drain-back feature can be practical for catching drips from the outlet end 40 when the consumer is finished dispensing from the container 70. The outlet end 40 can be a spout 45. The spout 45 can be a portion of the pour chamber 20 upstream of the outlet end 40. The spout 45 can have a spout inlet 47 upstream of the outlet end 40. The drain-back feature can comprise a floor 270 extending at least partially around the spout 45 and outwardly away from the spout 45. The drain-back feature can further comprise a channel wall 280 extending from the floor 270 in a direction away from the inlet end 30 to define a channel 290 between the spout 45 and the channel wall 280. The floor 270 can be sloped to the entrance 105 or to a hole in fluid communication with the pour chamber 20. The floor 270 can be sloped at an angle from horizontal of from about 5 degrees to about 45 degrees. The channel 290 can be described as being exterior to the pour chamber 20 or spout 45. The channel 290 can be further described as being beneath the spout 45. The channel 290 can further be described as positioned between the outlet end 40 and the inlet end 30.

The drain-back feature can also serve as the vent 100. Optionally, the drain-back feature can be separate from the vent 100.

The apparatus 10 further comprise a container 70 having an open end 250. The pour chamber 20, dam 80, vent 100, timer 150, and outlet closure 260 together can form at least part of a container closure.

The vent 100 can be independent from the drain-back feature. For instance the drain-back feature can be provided as a hole in the floor 270 of the channel 290 and a separate vent 100, structured as described above, can be provided at another location on the apparatus 10. For instance, the drain-back feature can comprise a hole connected to a drain-back tube 300.

The timer 150 can be mounted on the container 70. For example, the timer 150 can be mounted on a handle of the container 70. Optionally, the timer 150 can be mounted on the container 70 at a position between the handle and open end 250 of the container 70.

The apparatus 10 can be used in a process for dispensing a liquid product. As liquid product is dispensed through the outlet end 40 the timing liquid 230 accumulates in the collection reservoir 180. The consumer can observe the accumulation of timing liquid 230 in the collection reservoir 180 and once the level of timing liquid 230 in the collection reservoir 180 coincides with a dosing indicia 240 the consumer can turn the apparatus 10 upright to stop dispensing liquid product. As described herein, the consumer starts with the apparatus 10 in the first position, inverts the apparatus 10 into the second position to commence pouring of liquid through the outlet end 40, observes the level of timing liquid 230 accumulating in the collection reservoir 180, and when the level of the timing liquid 230 coincides with the desired dosing indicia 240 the consumer uprights the apparatus 10 by transitioning the apparatus 10 from the second position back to the first position.

The apparatus 10 can be manufactured by additive manufacturing, such as three-dimensional printing. This can be practical for geometries such as a curved spout 45, by way of nonlimiting example. The apparatus can be formed by injection molding. The apparatus 10 can comprise polypropylene, polyethylene, or other polymeric material.

Figure 12:
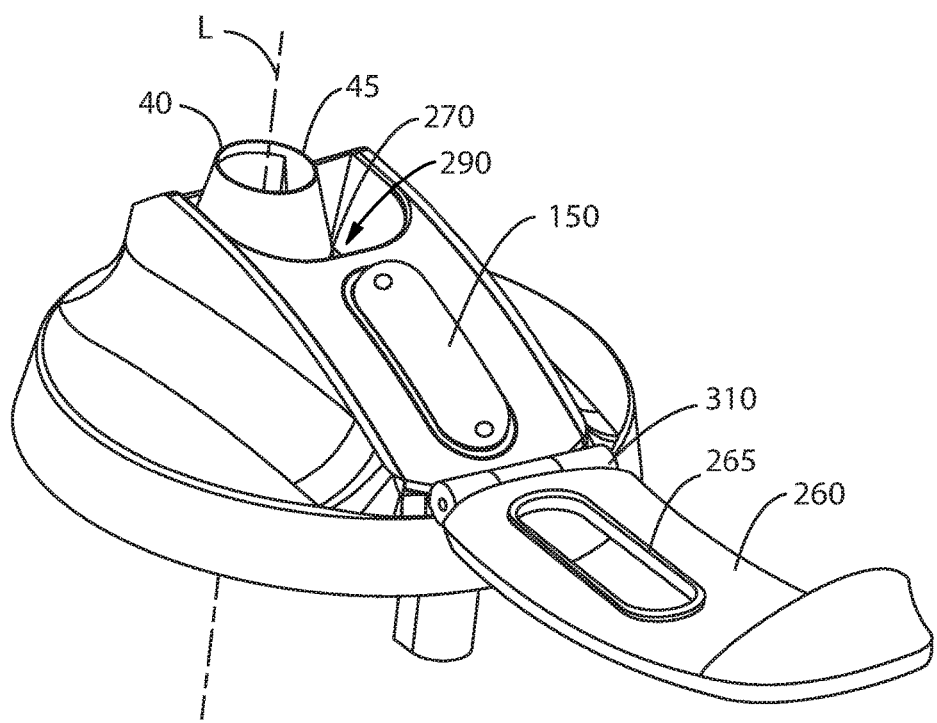
FIG. 12 is a perspective view of an apparatus.

As shown in FIG. 12, the apparatus can further comprise a hinged closure 260 engaged with the outlet end 40 by a hinge 310. The hinged closure 260 can have a window 265 through which the timer 150 is visible when the closure 260 is in a position in which the outlet end 40 is closed. The window 265 can be practical for enabling the consumer to observe that the apparatus 10 has a timer 150 when the apparatus 10 is presented to the consumer in a store or online. Without a window 265, the existence of the timer 150 may not be apparent to the consumer prior to using the apparatus 10.

Figure 13:
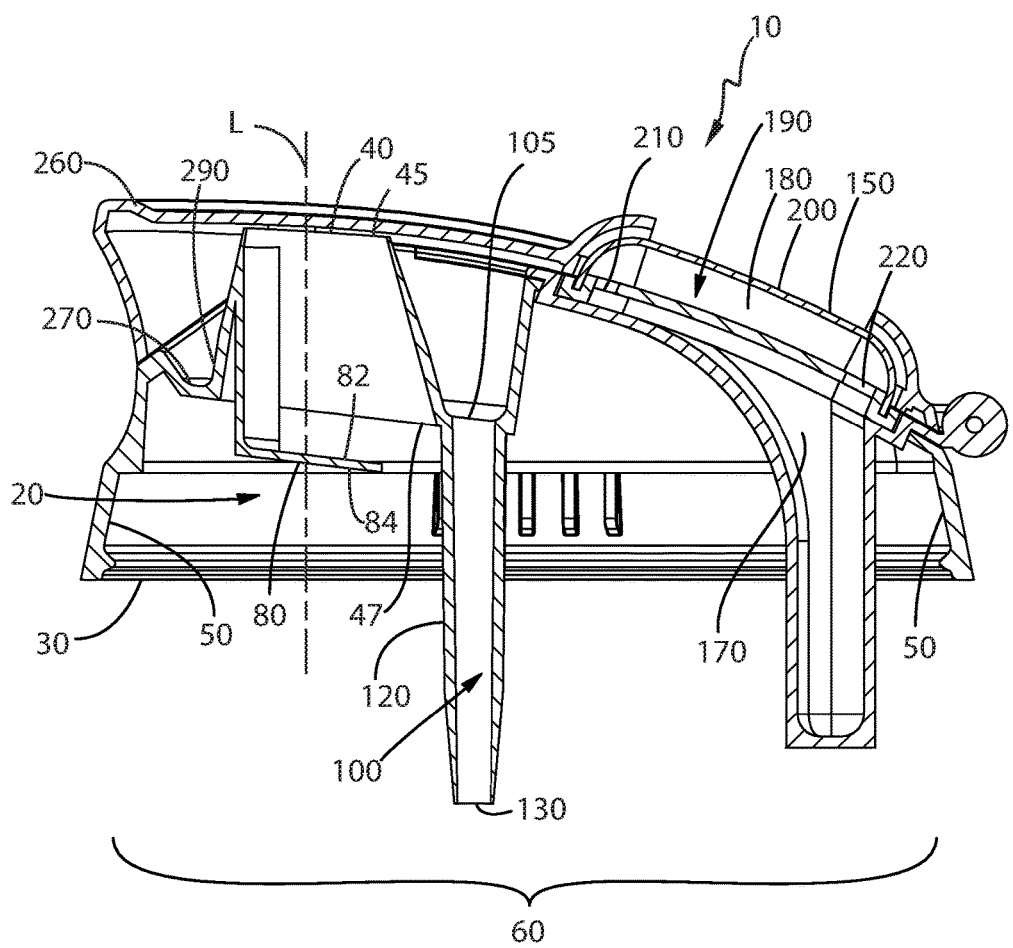
FIG. 13 is cross sectional view of an apparatus.

A cross section of the apparatus 10 shown in FIG. 12 is shown in FIG. 13, the closure 260 being in the closed position. As shown in FIG. 13, The dam 80 can extend from the pour chamber 20 on a side of the pour chamber 20 opposite the timer 150. Optionally the dam 80 can extend from the pour chamber 20 on the same side of the pour chamber 20 as the timer 150. In either arrangement, the dam 80 resists liquid flow from the inlet end 30 to the outlet end 40 by lengthening the stream lines of flow from the inlet end 30 to the outlet end 40 as compared to the streamlines of liquid flow that would occur in absence of the dam 80. The dam 80 can also help to reduce the variation in liquid flow rate out the outlet end 40 as a function of total head driving flow as compared to an apparatus 10 having the same structure in absence of the dam 80.

A perspective view of a cross section of the apparatus 10 shown in FIG. 12 with the closure 260 in the open position is shown in FIG. 14. As shown in FIGS. 12-14, the timer 150 can be visible to the consumer when the apparatus 10 is both the first position and the second position.

Figure 15:
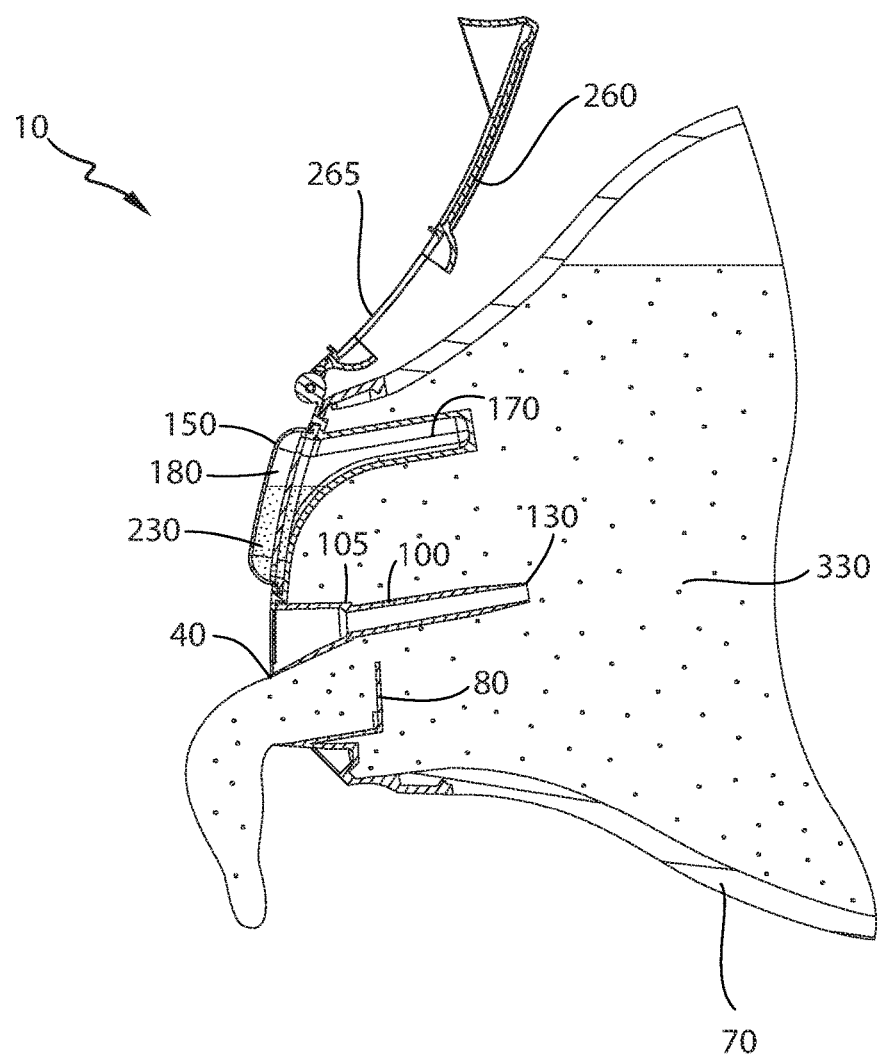
FIG. 15 is an illustration of an apparatus in use in the second position.

FIG. 15 is an illustration of an apparatus 10 in the second position in use. As shown in FIG. 15 when the user dispenses liquid product 330, the liquid product 330 can flow from the outlet end 40. To induce flow, the use tips the container 70 to transition the apparatus 10 from the first position to the second position. The timer 150 can be positioned such that flow of the liquid product 330 from the outlet end 40 and the timer 150 are both visible to the user. Once the timing liquid 230 reaches the level of the desired dosing indicia 240, which is indicative of a dispensing of the requisite volume of liquid product 330, the user can upright the container 70 to transition the apparatus 10 from the second position back to the first position. Timing liquid 230 accumulated in the collection reservoir 180 can flow back into the source reservoir 170 via the opening 220. Thus, the timing liquid 230 remains separate, or hydraulically intendent, or not in fluid communication with the liquid product 330.

Liquid product 330 dispensed from the container 70 is replaced by air that enters the container 70 via the vent 100. The exit 130 in the vent 100 can be small so that the liquid product 330 does not enter the vent 100. Bubbles of air passing through the vent 100 into the container can effectively block the vent 100 to flow of the liquid product. Further, a small vent 100 can also resist entry of the liquid product into the vent 100 since the liquid product 330 will have to overcome the capillary forces associated with movement of the liquid product 330 into the exit 130.

Examples and Combinations

An Example follows:
A. An apparatus (10) comprising:
a pour chamber (20) comprising an inlet end (30) and an outlet end (40) and a pour chamber wall (50) extending from said inlet end to said outlet end, wherein said pour chamber has an open cross sectional area (60) through which flow can occur from said inlet end to said outlet end, wherein said open cross sectional area is a function of position between said inlet end and said outlet end, said outlet end being downstream of said inlet end, wherein said outlet end has an outlet perimeter (90), and wherein a portion of said pour chamber upstream of said outlet end is a spout (45) having a spout entrance (47) upstream of said outlet end;
a dam (80) engaged with said pour chamber wall and positioned between said inlet end and said spout, wherein said open cross sectional area is reduced where said dam is positioned as compared to a position immediately upstream of said dam, and wherein said dam partially obstructs said spout entrance;
a vent (100) comprising an entrance (105) spaced apart from said outlet end and a vent wall (120) extending from said entrance to an exit (130), wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter (140) and said outlet perimeter (90) is more than about 2 times greater than said exit perimeter; and
a timer (150) engaged with said pour chamber, said timer comprising:
a source reservoir (170);
a collection reservoir (180) having an interior space (190) and an exterior surface (200), wherein at least a portion of said interior space is visible from said exterior surface;
a timing orifice (210) connecting said source reservoir and said collection reservoir;
an opening (220) connecting said collection reservoir and said source reservoir positioned away from said timing orifice; and
a timing liquid (230) having a fixed volume contained in one or both of said source reservoir and said collection reservoir, wherein said timing liquid, said source reservoir, and said collection reservoir are not in fluid communication with said pour chamber.

B. The apparatus according to Paragraph A, wherein said apparatus has a first position in which said outlet end is above said inlet end and a second position in which said inlet end is above said outlet end, wherein when said apparatus is in said second position a greater quantity of said timing liquid is in said collection reservoir than when said apparatus is in said first position, and wherein when said apparatus is in said second position said timing liquid is visible from said exterior surface.

C. The apparatus according to Paragraph A or B, wherein said collection reservoir comprises at least one dosing indicia (240) visible from said exterior surface.

D. The apparatus according to any of Paragraphs A to C further comprising a container (70) having an open end (250), wherein said pour chamber, said dam, said vent, and said timer are engaged with said open end.

E. The apparatus according to any of Paragraphs A to D, wherein an outlet closure 260 is engaged with said outlet end 40, said outlet closure optionally a hinged outlet closure.

F. The apparatus according to any of Paragraphs A to E, wherein said apparatus further comprises a floor (270) extending at least partially around said spout and outwardly away from said spout and a channel wall (280)

extending from said floor in a direction away from said inlet end (30) to define a channel (290) between said spout and said channel wall, wherein said floor is sloped to said entrance or to a hole in fluid communication with said pour chamber.

G. The apparatus according to any of Paragraphs A to F further comprising a container (70) having an open end (250), wherein said pour chamber, said dam, said vent, said timer, and said outlet closure together form at least part of a container closure.

H. The apparatus according to any of Paragraphs A to G, wherein said exit is more than about 1.5 times more distant from said dam than said outlet end is from said dam.

I. The apparatus according to any of Paragraphs A to H, wherein said apparatus further comprises a floor (270) extending at least partially around said spout and outwardly away from said spout and a channel wall (280) extending from said floor in a direction away from said inlet end (30) to define a channel (290) between said spout and said channel wall, wherein said floor is sloped to a hole in fluid communication with said pour chamber and said vent is separate from said hole.

J. The apparatus according to any of Paragraphs A to C, E, F, H, and I, wherein said timer is mounted on a container (70).

K. The apparatus according to any of Paragraphs A to J, wherein said apparatus has a first position in which said outlet end is above said inlet end and a second position in which said inlet end is above said outlet end, wherein when said apparatus is in said first position said timing orifice is above said opening, when said apparatus is in said second position said timing orifice is below said opening, when said apparatus is transitioned from said first position to said second position said timing fluid moves from said source reservoir to said collection reservoir through said timing orifice.

L. The apparatus according to any of Paragraphs A to K, wherein the ratio between said outlet perimeter to said exit perimeter is from about 2:1 to about 20:1, preferably from about 2:1 to about 15:1, more preferably from about 2:1 to about 10:1.

M. The apparatus according to any of Paragraphs A to L, wherein said dam is located at said spout entrance.

N. A process for dispensing a liquid product with the apparatus according to any of Paragraphs A to M, wherein as liquid product is dispensed through said outlet end said timing liquid accumulates in said collection reservoir.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus comprising:
   a pour chamber comprising an inlet end and an outlet end and a pour chamber wall extending from said inlet end to said outlet end, wherein said pour chamber has an open cross sectional area through which flow can occur from said inlet end to said outlet end, wherein said open cross sectional area is a function of position between said inlet end and said outlet end, said outlet end being downstream of said inlet end, wherein said outlet end has an outlet perimeter, and wherein a portion of said pour chamber upstream of said outlet end is a spout having a spout entrance upstream of said outlet end;
   a dam engaged with said pour chamber wall and positioned between said inlet end and said spout, wherein said open cross sectional area is reduced where said dam is positioned as compared to a position immediately upstream of said dam, and wherein said dam partially obstructs said spout entrance;
   a vent comprising an entrance spaced apart from said outlet end and a vent wall extending from said entrance to an exit, wherein said exit is in fluid communication with said pour chamber, wherein said exit is more distant from said dam than said outlet end is from said dam, wherein said exit is more than about 0.5 times said outlet perimeter away from said dam, and wherein said exit has an exit perimeter and said outlet perimeter is more than about 2 times greater than said exit perimeter; and
   a timer engaged with said pour chamber, said timer comprising:
      a source reservoir;
      a collection reservoir having an interior space and an exterior surface, wherein at least a portion of said interior space is visible from said exterior surface;
      a timing orifice connecting said source reservoir and said collection reservoir;
      an opening connecting said collection reservoir and said source reservoir positioned away from said timing orifice; and
      a timing liquid having a fixed volume contained in one or both of said source reservoir and said collection reservoir, wherein said timing liquid, said source reservoir, and said collection reservoir are not in fluid communication with said pour chamber.

2. The apparatus according to claim 1, wherein said apparatus has a first position in which said outlet end is above said inlet end and a second position in which said inlet end is above said outlet end, wherein when said apparatus is in said second position a greater quantity of said timing liquid is in said collection reservoir than when said apparatus is in said first position, and wherein when said apparatus is in said second position said timing liquid is visible from said exterior surface.

3. The apparatus according to claim 2, wherein said collection reservoir comprises at least one dosing indicia visible from said exterior surface.

4. The apparatus according to claim 3 further comprising a container having an open end, wherein said pour chamber, said dam, said vent, and said timer are engaged with said open end.

5. The apparatus according to claim 4, wherein an outlet closure is engaged with said outlet end 40.

6. The apparatus according to claim 5, wherein said pour chamber, said dam, said vent, said timer, and said outlet closure together form at least part of a container closure.

7. The apparatus according to claim 6, wherein said apparatus further comprises a floor extending at least partially around said spout and outwardly away from said spout and a channel wall extending from said floor in a direction away from said inlet end to define a channel between said spout and said channel wall, wherein said floor is sloped to said entrance or to a hole in fluid communication with said pour chamber.

8. The apparatus according to claim 7, wherein said exit is more than about 1.5 times more distant from said dam than said outlet end is from said dam.

9. The apparatus according to claim 6, wherein said exit is more than about 1.5 times more distant from said dam than said outlet end is from said dam.

10. The apparatus according to claim 6, wherein said apparatus further comprises a floor extending at least partially around said spout and outwardly away from said spout and a channel wall extending from said floor in a direction away from said inlet end to define a channel between said spout and said channel wall, wherein said floor is sloped to a hole in fluid communication with said pour chamber and said vent is separate from said hole.

11. The apparatus according to claim 10, wherein said exit is more than about 1.5 times more distant from said dam than said outlet end is from said dam.

12. A process for dispensing a liquid product with the apparatus according to claim 11, wherein as liquid product is dispensed through said outlet end said timing liquid accumulates in said collection reservoir.

13. The apparatus according to claim 1 wherein said apparatus has a first position in which said outlet end is above said inlet end and a second position in which said inlet end is above said outlet end, wherein when said apparatus is in said first position said timing orifice is above said opening, when said apparatus is in said second position said timing orifice is below said opening, when said apparatus is transitioned from said first position to said second position said timing fluid moves from said source reservoir to said collection reservoir through said timing orifice.

14. The apparatus according to claim 13, wherein said collection reservoir comprises at least one dosing indicia visible from said exterior surface.

15. The apparatus according to claim 14 further comprising a container having an open end, wherein said pour chamber, said dam, said vent, and said timer are engaged with said open end.

16. The apparatus according to claim 15, wherein a hinged outlet closure 260 is engaged with said outlet end.

17. The apparatus according to claim 15, wherein said pour chamber, said dam, said vent, said timer, and said outlet closure together form at least part of a container closure.

18. The apparatus according to claim 17, wherein said apparatus further comprises a floor extending at least partially around said spout and outwardly away from said spout and a channel wall extending from said floor in a direction away from said inlet end to define a channel between said spout and said channel wall, wherein said floor is sloped to said entrance or to a hole in fluid communication with said pour chamber.

19. The apparatus according to claim 18, wherein said exit is more than about 1.5 times more distant from said dam than said outlet end is from said dam.

20. A process for dispensing a liquid product with the apparatus according to claim 13, wherein as liquid product is dispensed through said outlet end said timing liquid accumulates in said collection reservoir.

\* \* \* \* \*